United States Patent [19]
Hullot

[11] Patent Number: 5,163,130
[45] Date of Patent: Nov. 10, 1992

[54] SYSTEM AND METHOD FOR CONFIGURING A GRAPHIC INTERFACE

[75] Inventor: Jean-Marie Hullot, La Celle Saint Cloud, France

[73] Assignee: NeXT Computer, Inc., Redwood City, Calif.

[21] Appl. No.: 879,126

[22] Filed: May 5, 1992

Related U.S. Application Data

[63] Continuation of Ser. No. 419,764, Oct. 11, 1989, abandoned.

[51] Int. Cl.$^5$ .............................................. G06F 15/20
[52] U.S. Cl. .................................................... 395/148
[58] Field of Search .............................. 395/144-149, 395/155, 157, 159, 161

[56] References Cited

U.S. PATENT DOCUMENTS

| | | | |
|---|---|---|---|
| 4,315,315 | 2/1982 | Kossiakoff | 364/518 |
| 4,860,204 | 8/1989 | Gendron et al. | 364/518 X |
| 4,885,717 | 12/1989 | Beck et al. | 364/900 |
| 4,914,568 | 4/1990 | Kodosky et al. | 364/200 |

Primary Examiner—Heather R. Herndon
Attorney, Agent, or Firm—Laurence S. Rogers; Jeffrey H. Ingerman

[57] ABSTRACT

A graphic interface configuration system is allows a user to create a graphic interface for a computer program in which graphic elements in the interface are linked to variables or functions in any one of a number of programming elements.

21 Claims, 11 Drawing Sheets

| | 501 |
|---|---|
| TYPE | OUTLET/TARGET-ACTION |
| SOURCE | <POINTER> |
| DESTINATION | <POINTER> |
| OUTLET | VARIABLE NAME |
| ACTION | FUNCTION NAME |

SYSTEM AND METHOD FOR CONFIGURING A GRAPHIC INTERFACE

This is a continuation of application Ser. No. 07/419,764, filed Oct. 11, 1989, abandoned entitled SYSTEM AND METHOD FOR CONFIGURING A GRAPHIC INTERFACE.

BACKGROUND OF THE INVENTION

This invention relates to computers having graphically-oriented user interfaces. More particularly, this invention relates to such computers which provide the facility for users to create their own graphic interfaces for application programs that they write. Most particularly, this invention relates to a system and method for allowing users to link graphic elements of interfaces that they create to specific variables and functions in their application programs.

Computer systems are known in which the operating system provides a graphic interface with the computer user. The user can run application programs, manipulate files, and perform substantially all other functions needed by the average user by manipulating graphic images on the computer's display, either by using cursor control keys and other keyboard keys or by using a cursor controlling peripheral device such as a joystick, "mouse" or track ball.

In such a system, programs are frequently represented by small graphic images that identify the programs to the user. For example, a word processing program might be represented by a graphic image of a piece of paper having lines of text on it and a writing instrument such as a pencil or a quill pen writing on the page. A program is invoked by moving the cursor or a pointer to the graphic image representing the program (e.g., by using a mouse), and then pressing the appropriate button (e.g., the mouse button or the "Enter" key on the keyboard).

Similar facility is provided within programs that run on such systems. Thus, within the word processing program referred to above, various graphic elements are arranged within various windows which can be opened with the mouse, and the various graphic elements invoke various functions of the program (e.g., create a new document, retrieve an existing document, delete a document, print a document). These graphic interface features within applications programs are created by the writer of the program, based on knowledge of the operating system of the computer for which the software is written.

More recently, it has been known to provide as part of the operating system of some computers a graphic interface configuration utility that allows users to create graphic interfaces for their own application programs by using a set of "tools" provided in a "palette/toolbox" that appears on the screen when the utility is in use. The tools include line drawing functions, the ability to apply certain colors or shading to certain elements placed on the screen, and the ability to place boxes and other items (e.g., "buttons") at desired locations on the screen. The ability to create fields into which text or variables (e.g., for mathematical formulae) can be entered is also available. For example, a user may have written a simple program to give as a result the sum of two numbers, x and y, entered by the end user. Therefore, the user would use the graphic interface configuration utility to create three fields on the screen—one for x, one for y, and one for the result, as well as a button to invoke the part of the program that performs the calculation. In order for such an interface to function, the fields must be linked to the appropriate variables in the underlying program, and the button must be linked to the appropriate code for performing the desired function (here, addition). The known graphic interface configuration utility provided a way for those links to be made in the case of the functional button, but not in the case of the variable fields. The program itself had to link the variables to the variable fields.

Furthermore, graphic-interface-oriented computers frequently use object-oriented programming languages, such as object-oriented C or objective FORTRAN. In such programming languages, programs are divided into a plurality of programming elements known as objects. In the known graphic interface configuration utility, when a particular window and its contents are defined, any button-type graphic elements in the window could be linked to portions of a single programming element or object, but not to different objects, which frequently limits the ability of the user to configure an interface to achieve a desired result. This is also a limitation when standard programming languages are used and more than one program is involved.

It would be desirable to be able to provide a graphic interface configuration utility that would allow fields in the interface to be linked to variables in an underlying program.

It would also be desirable to be able to provide a graphic interface configuration utility that would allow graphic elements in the interface to be linked to variables or functions in any one of a number of programming elements.

SUMMARY OF THE INVENTION

It is an object of this invention to provide a graphic interface configuration utility that allows fields in the interface to be linked to variables in an underlying program.

It is also an object of this invention to provide a graphic interface configuration utility that allows graphic elements in the interface to be linked to variables or functions in any one of a number of programming elements.

In accordance with this invention, a graphic interface configuration utility is provided for use in a computer system having a visual display on which an application program is represented by a graphic image, the application program having at least one program element having variables and action portions, and the application program being executed through a graphical program interface that provides windows on the display, which windows contain graphic elements representing user inputs. The graphic image and graphic elements are capable of being moved on said display by a user. The graphical program interface configuration system includes graphical definition means for creating the window, graphical placement means for placing at least one of the graphic elements in the window, and graphical connection means for logically connecting each graphic element to any one of a number of program elements.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Although the graphic interface configuration system of the present invention can be used on computers using any number of programming languages, it is best suited to computers running object-oriented programming languages such as those described above, and the preferred embodiment of the invention is designed for a computer whose graphic interface is written in the object-oriented C programming language. Therefore, the discussion that follows will be tailored at least in part to object-oriented programming, and to object-oriented C programming in particular. It is to be understood, however, that the present invention is not limited to systems that run object-oriented programming languages.

The graphic interface configuration system of the present invention is a self-contained utility that is separate from the underlying programs for which it is used to create interfaces. The underlying programs can be written before or after the interface is created, and are generally capable of being executed without an interface created by the present invention, or even without any graphic interface at all.

A user of the present invention may invoke the graphic interface configuration system either before or after the underlying program, an interface for which is to be created, has been written. If the program has not been written, the present invention allows the user to define the existence of certain variables and functions sufficiently to allow the user to construct the necessary graphic interface. At the same time it creates a skeletal program in which the variables and data structures are defined, so that the user can go back afterwards and define the remainder of the program. The remainder of the discussion will assume that the program has been written, and that the interface configuration system of the invention has available to it knowledge of the program structure. How that knowledge is acquired will be discussed below.

Figure 1:
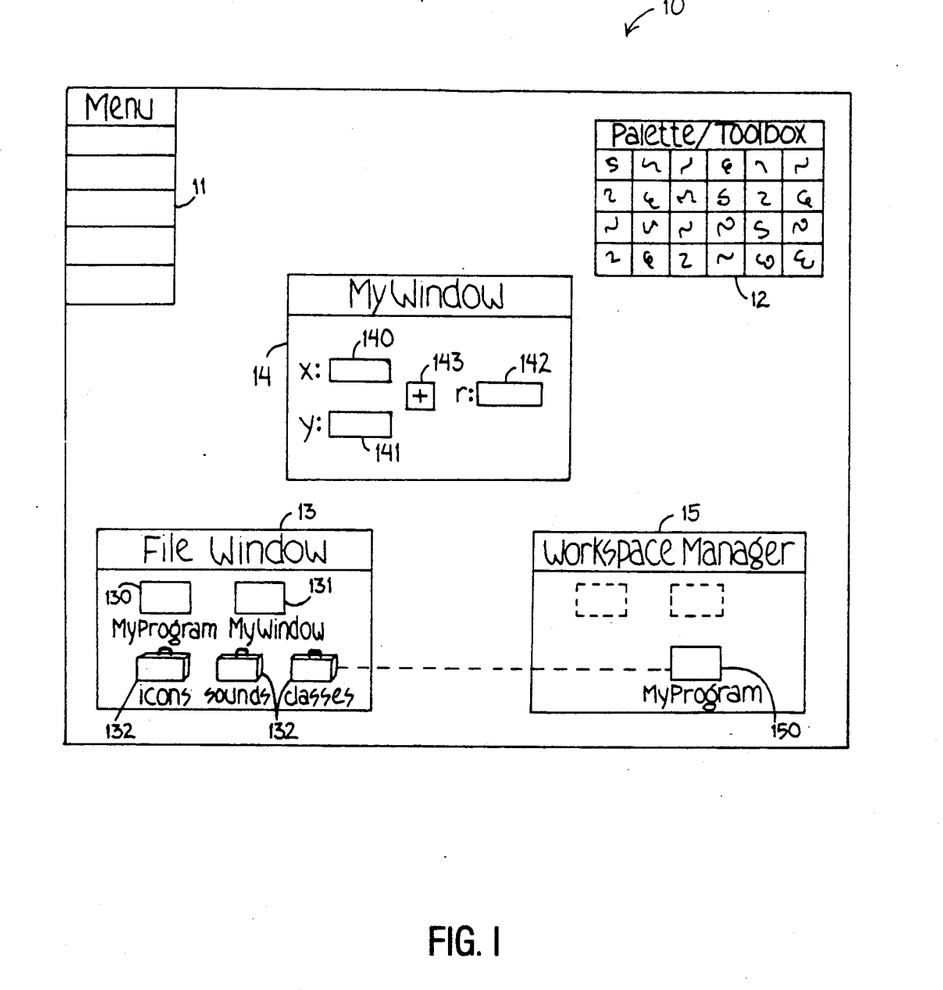
FIG. 1 shows a screen display presented to a user of the graphic interface configuration system and method of the present invention.

FIG. 1 is a diagrammatic representation of a computer display that is seen when a user has entered the graphic interface configuration system of the invention, has identified to the system the program file for which the interface is to be created, and has created the interface display screen. In this case, the user program, named myProgram, is a simple program, as described above, for taking two numbers, x and y, as inputs and displaying their sum as the result, r.

As shown in FIG. 1, display 10 shows the interface configuration system menu 11 from which the user has already selected the new application function, a palette/toolbox 12 from which the user has selected a window, three boxes and a button, and a file window 13 displaying information regarding files being worked on. Specifically, file window 13 contains a graphic element 130 representing myProgram, which has no visual counterpart, a graphic element 131 representing myWindow, which is the window 14 being defined by the user, and three graphic elements 132 in the shape of suitcases which represent various file characteristics. The user can open and close myWindow 14 by clicking on its representation 131.

The user has defined myWindow 14 to contain a field 140 preceded by a text label "x: ", a field 141 preceded by a text label "y: ", a field 142 preceded by a text label "r: ", and a button 143 labelled "+". The program is used by moving the pointer to field 140 and clicking the mouse button, thus allowing entry of the value x, then doing the same with field 141 to enter the value y, then moving the pointer to button 143 and clicking, which invokes the functional portion of myProgram, causing the sum of x and y to be displayed in field 142.

Figure 2:
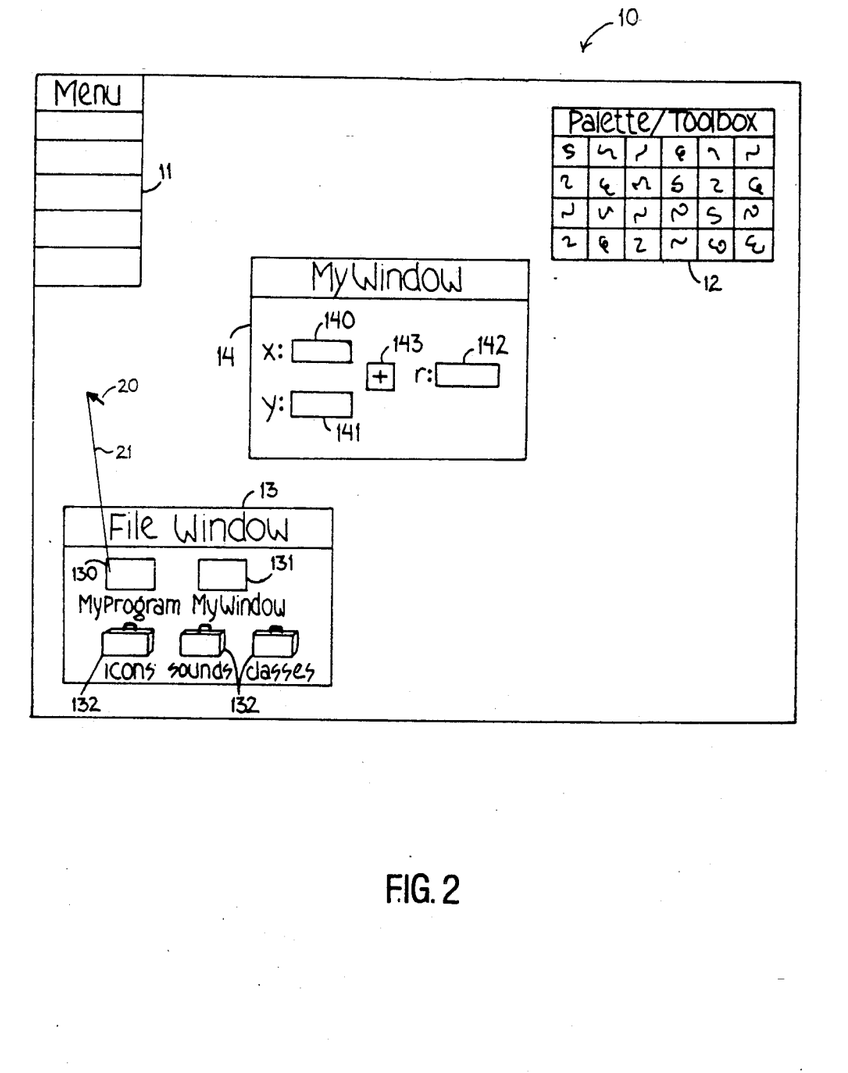
FIG. 2 shows another screen display presented to a user of the graphic, interface configuration system and method of the present invention.
Figure 3:
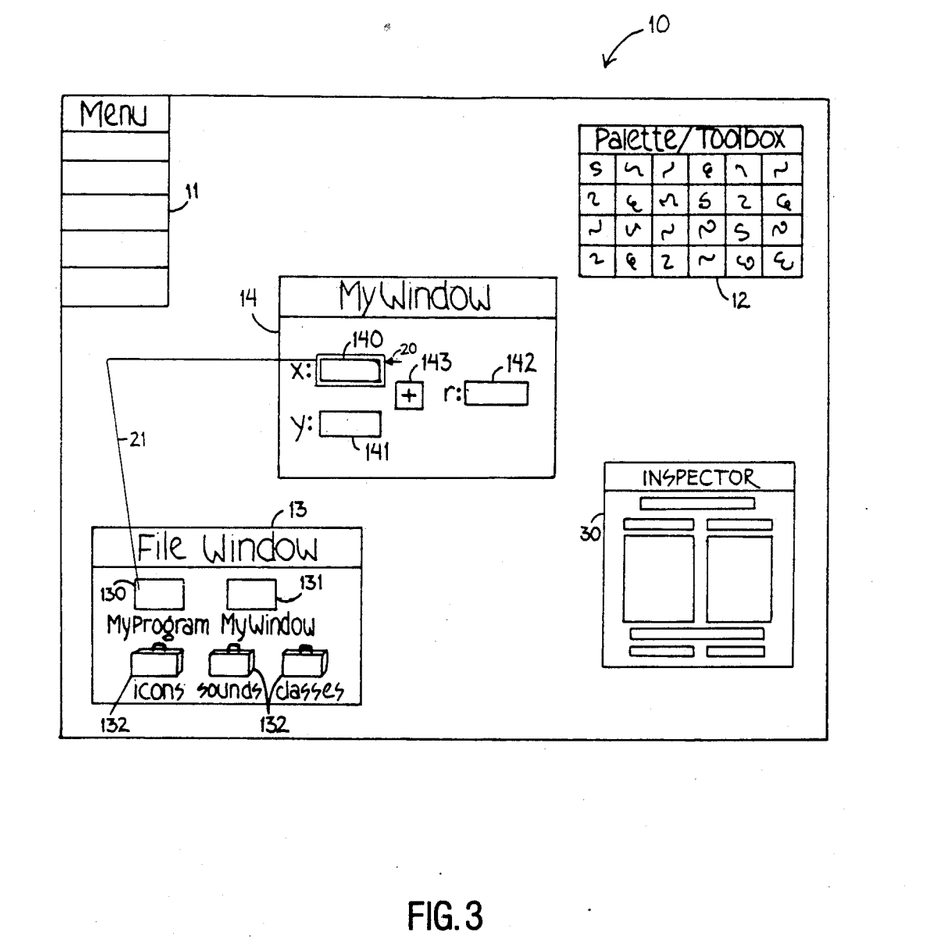
FIG. 3 shows another screen display presented to a user of the graphic interface configuration system and method of the present invention.

In order to have the program work in this way, it is necessary to link fields 140–142 to the variables in myProgram representing x, y and r, and to link button 143 to the functional portion of myProgram. In accordance with the preferred embodiment of the present invention, such linkage, or connection, is established as follows:

To link a field to a variable in a program, the user selects the program by moving the pointer 20 to the representation of that program in file window 13 (although not the case in FIG. 1, there maybe more than one program from which to choose), and clicking the mouse button while holding down the control (CTRL) key on the computer keyboard. While continuing to hold the mouse button down (the control key can be released), the user moves the mouse toward the field of interest, drawing a line 21, as shown in FIG. 2, from the program representation. When the line reaches the field of interest (e.g., field 140) and the user releases the mouse button, the field is highlighted, as shown in FIG. 3. At that point, a new window 30 appears on display 10, unless it was already present from a previous activity. Window 30 is called the inspector window, and it is shown in more detail in FIG. 4. In this mode of operation—i.e., the linking or "connection" mode—the function of inspector window 30 is to display the variables and function routines of the program to which graphic elements are to be connected, and to facilitate the making of such connections.

Figure 4:
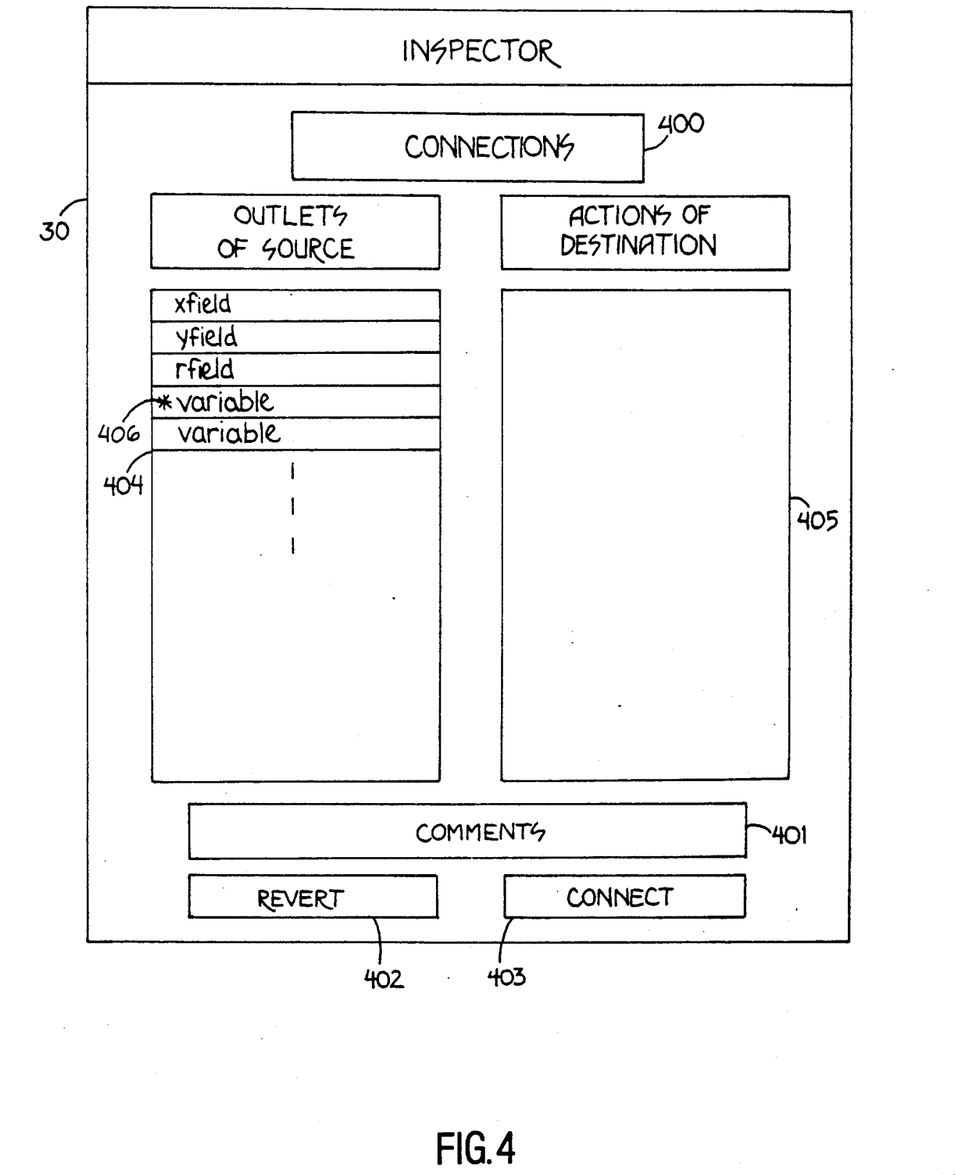
FIG. 4 shows a portion of the screen display of FIG. 3.

Inspector window 30 has a mode subwindow 400 which displays the mode of operation of inspector window 30, which has several different modes of operation. As shown in FIG. 4, inspector window 30 is in the connection mode. Inspector window 30 also has a comment subwindow 401 which displays different comments depending on the mode of operation and on what portion of inspector window 30 is highlighted. Inspector window 30 also has two "buttons" 402, 403 which initiate functions when clicked on with the mouse. Button 402, labelled "Revert", has no function, and in fact is disabled, in connection mode. Button 403, labelled "Connect", serves a connect/disconnect function, as described in more detail below, in connection mode. Finally, inspector window 30 has two subwindows 404, 405, respectively labelled "Outlets of Source" and "Actions of Destination", which respectively list the variables and program function routines available for connection.

With the variables of myProgram displayed in subwindow 404, the user moves the pointer to the desired variable and clicks to highlight it (not shown). The user then moves the pointer to the connect/disconnect button 403, which is then labelled "Connect", and clicks. That establishes the connection between the variable and the field in myWindow that is highlighted. At that point, a flag, such as asterisk 406, appears next to the variable name in subwindow 404, indicating that that variable is connected and not available for other connections. At the same time, the label of the connect/disconnect button changes to "Disconnect" (not shown).

If, when inspector window 30 is first opened, there are already connected variables listed in subwindow 404 (from a previous connection operation), then asterisk 406 will already be displayed for each connected variable, and if the user highlights a variable that is already connected, a line like line 21 will be displayed, showing the connection to myProgram. This allows connections to be checked, either to make sure they are correct, or to find out what they are. If the user had drawn line 21, intending to connect an unconnected variable, but highlights a connected variable by mistake, line 21 will disappear, and will be replaced by a line between the field to which that variable is connected and myProgram. In the preferred embodiment line 21 has to be redrawn by the user before field 140 can be connected to another variable, although it may be possible to provide an "Undo" function that will unhighlight the already connected variable and restore line 21 automatically. Again, whenever a connection is displayed, button 403 will be labelled "Disconnect" and the user has the option of clicking that button to disconnect the variable or ignoring the Disconnect button and choosing another variable.

The above process can be repeated until all fields are connected to the desired variables. It is then necessary to connect any action buttons, such as button 143, to the program structures that perform the desired functions. Such connections are established by a process that is similar to that for linking fields to variables, except that instead of positioning the pointer over the program representation in file window 13 and drawing a line to the desired field, one starts with the pointer on the desired button. Again, the mouse button is held down while CTRL is being pressed and a line is drawn (not shown) from button 143 to representation 130 of myProgram in file window 13 which becomes highlighted as did field 140 in the process described above.

Figure 5:
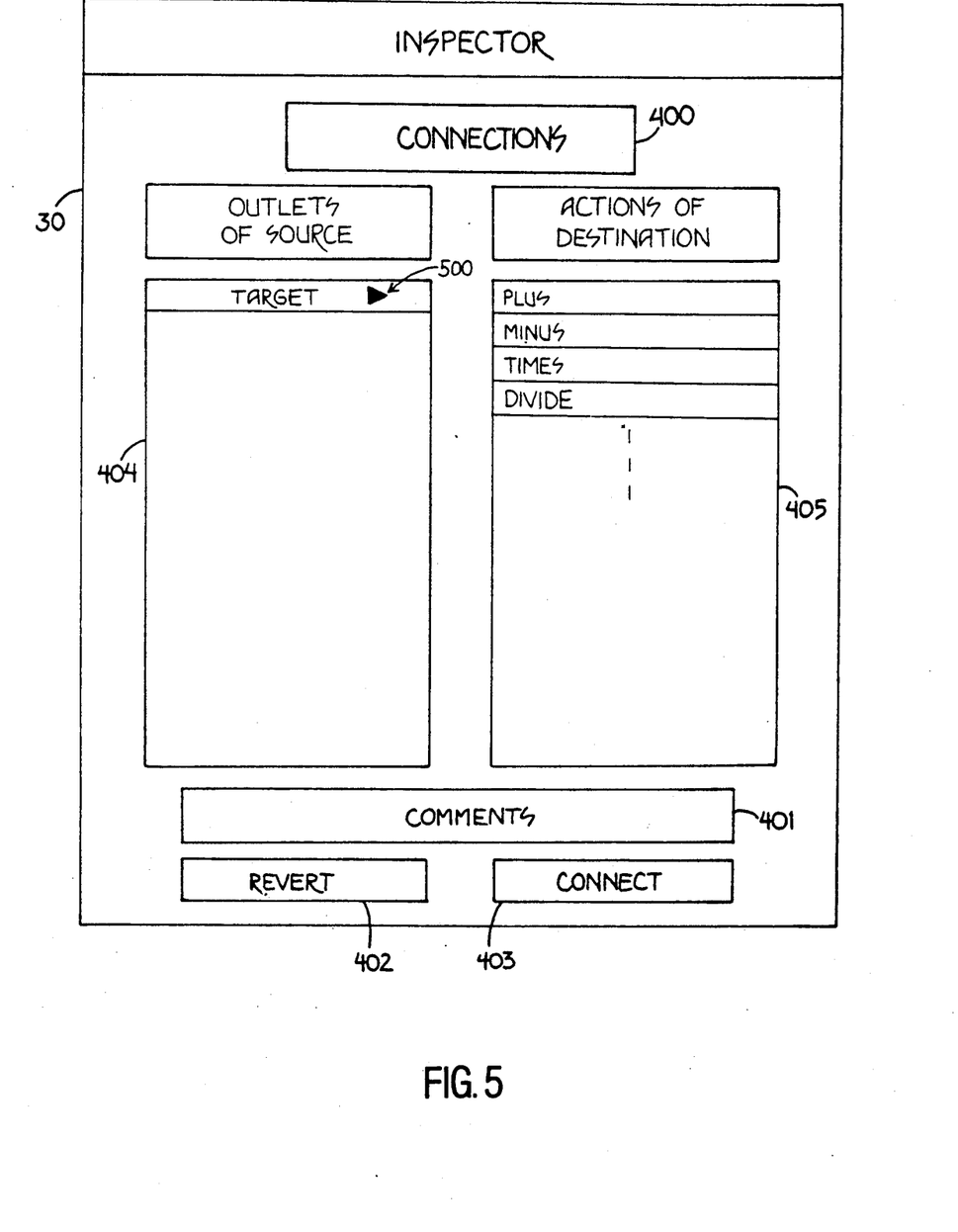
FIG. 5 shows another form of the display of FIG. 4.

In this case, the display in inspector window 30 is slightly different, as shown in FIG. 5. The user is really interested in connecting an action to myProgram. However, in the preferred embodiment of the invention, only variables (or "outlets") can be connected to a program. Therefore, when an action is to be connected, it must be connected through a special variable known as "Target", which is one of the variables that will be displayed in subwindow 404 during the action connection process, as shown in FIG. 5. The listing for the variable "Target" will be marked by an arrow 500 pointing toward action subwindow 405, where various possible actions, available through corresponding structures in myProgram, are listed. To connect the action "Plus" to button 143, the user highlights the variable "Target", then the action "Plus" and clicks on "Connect" button 403. As in the case of variables, an asterisk or other flag (not shown) is displayed next to the name of a connected action, and when it is highlighted, "Connect" button 403 becomes a "Disconnect" button. Similarly, existing connections to a program will be displayed if a connected action is highlighted.

In the case, referred to above, when a program already exists, its characteristics are made available to the graphic interface configuration system of the present invention through a facility in the preferred embodiment of the operating system known as the workspace manager. The workspace manager provides a window 15, shown in FIG. 1, in which representations of various available files are displayed. By highlighting representation 150 of myProgram, dragging it to File Window 13, and dropping it into that one of suitcases 132 labelled "classes", the user makes the characteristics of myProgram known to the graphic interface configuration system.

When a graphic interface has been configured and the user signifies completion of the configuration process by selecting "Save" from menu 11, the graphic interface configuration system stores the graphic interface configuration in a file containing a list of all programming objects related to the interface and a list of connections. For each connection in the connection list, the system stores as part of the graphic interface configuration file a table 501 (shown in FIG. 5A) containing the type of connection 502 (outlet or target-action), its source 503 (for an outlet) or destination 504 (for a target-action) in the form of a pointer to the correct object in the object list, and the name 505 of the outlet variable or action object. When the configuration file, including one or more tables 501, has been saved, the work of the graphic interface configuration system of the invention is complete.

Figure 5A:
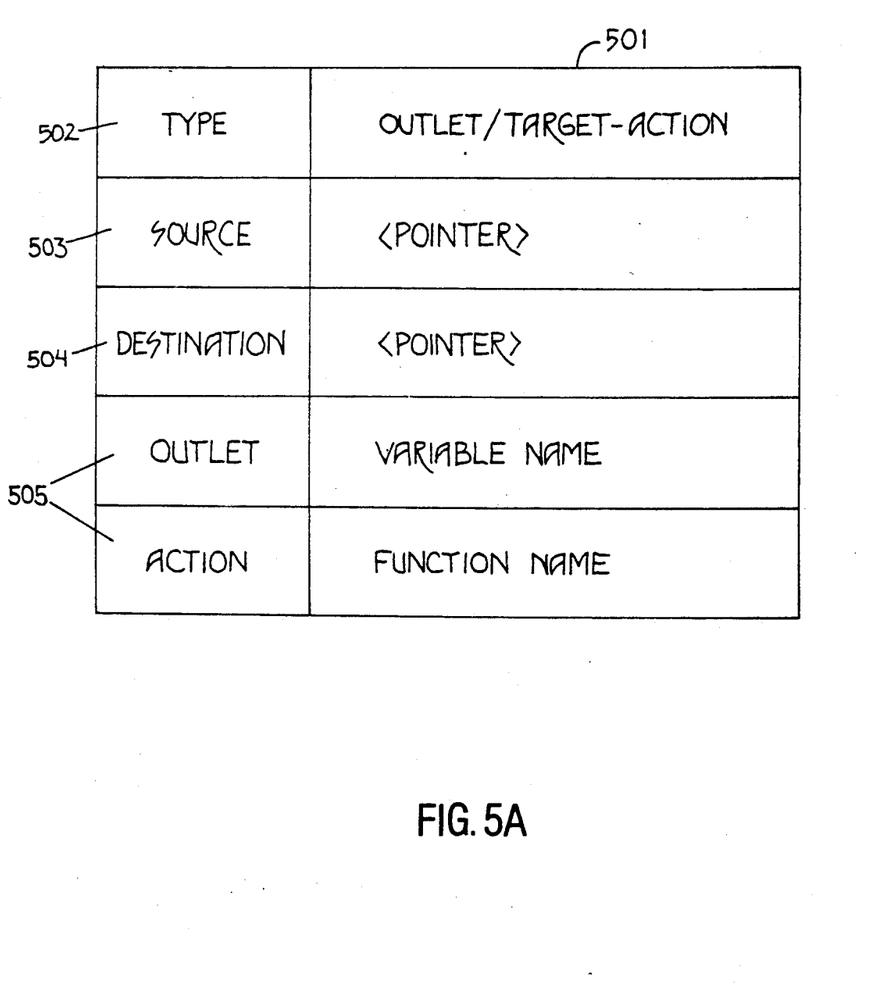
FIG. 5A shows a table of information stored in accordance with the present invention.

When the user writes the program for which the interface is constructed, whether before or after the interface has been constructed, the first line must be an instruction to load and execute the graphic interface configuration file. Execution of the configuration file loads the correct files, makes the appropriate connections (based in part on the tables 501), and displays the correct windows and other graphic elements, so that the end user of the program is faced only with the interface.

Figure 6:
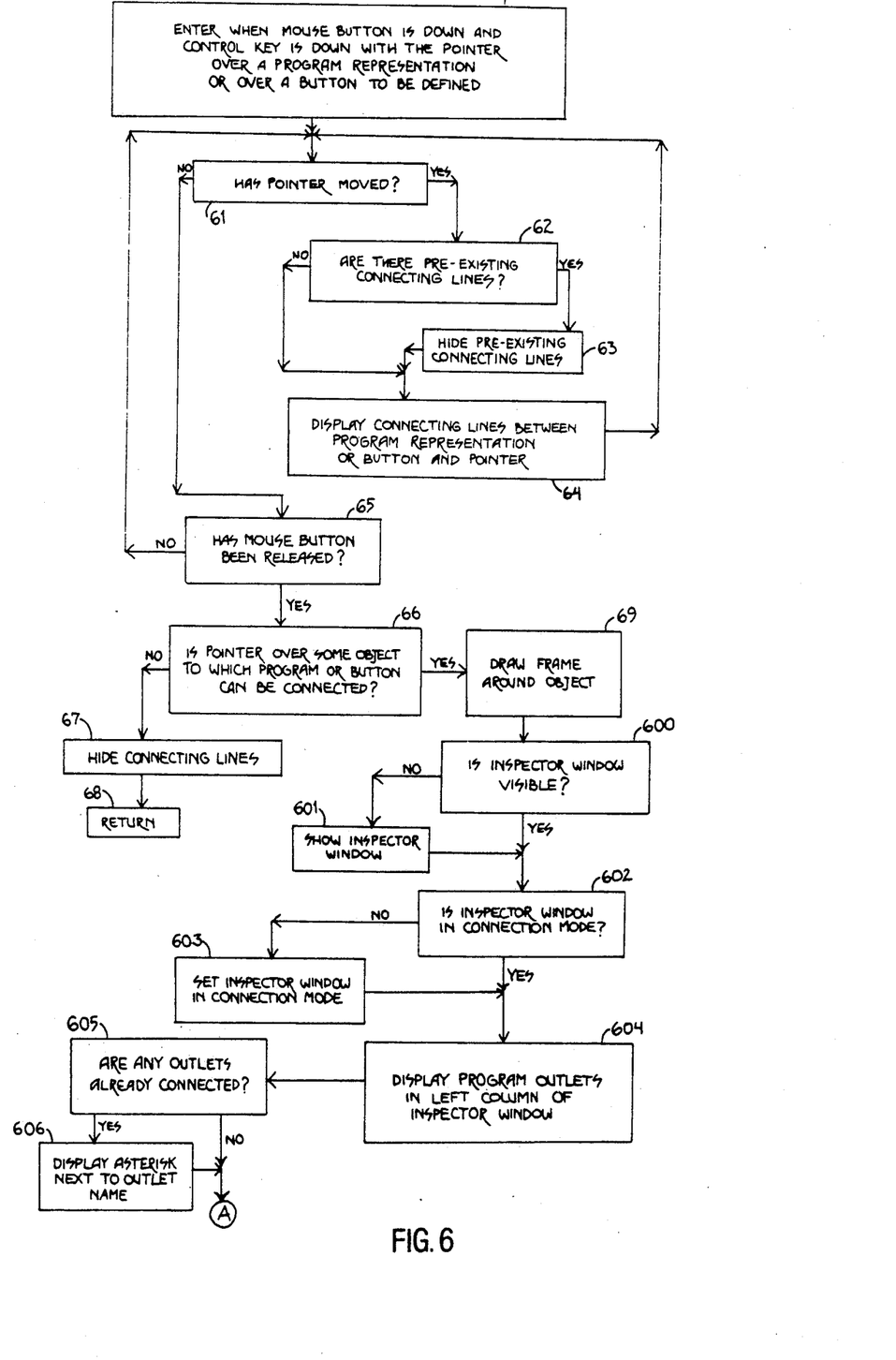
FIGS. 6 and 6A (hereinafter collectively referred to as FIG. 6) are a flow diagram of a portion of the process implemented by the system and method of the present invention when a user begins the connection process.
Figure 6A:
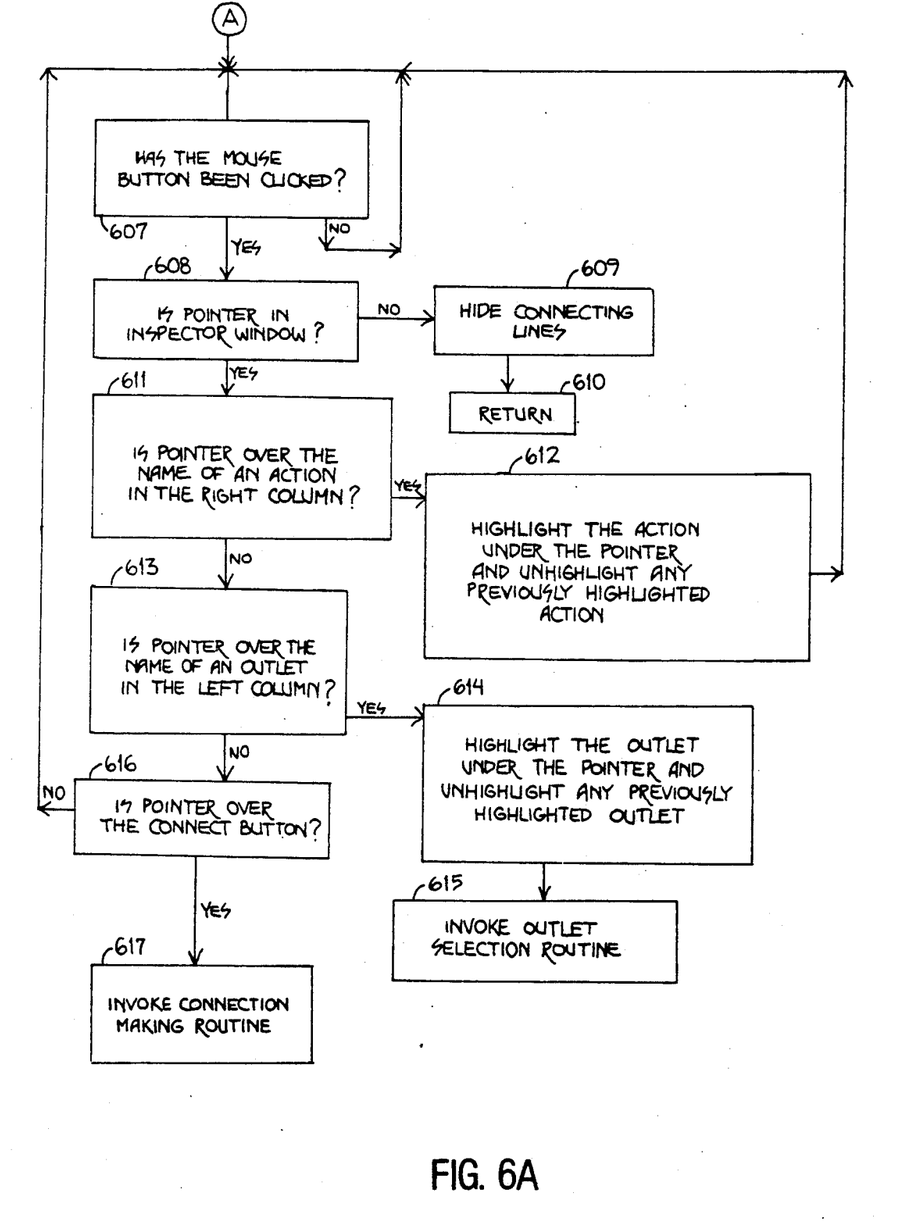

FIG. 6 is a flow diagram of a routine (hereinafter referred to as the main connection routine) which is invoked, at step 60, when a user presses a mouse button while the CTRL key is down and pointer 20 is over a program representation such as graphic element 130, or over a screen button object such as button 143. At test 61, the system checks to see if the pointer has moved. If the pointer has moved, then at test 62, the system tests to see if there are pre-existing connecting lines. If there are pre-existing connecting lines, they are removed from the screen at step 63. Whether or not there were preexisting connecting lines, new connecting lines between program representation 130, or button 143, and pointer 20 are displayed at step 64, and the system returns to test 61 to check for further pointer movement.

If at test 61 the pointer has not been moved, then the system checks at test 65 to see if the mouse button has been released. If the mouse button has not been released, the system returns to test 61 to continue checking for pointer movement. If at test 65 the mouse button has been released, then at test 66 the system checks to see if the pointer is over a type of object to which the program represented by element 130 (if the connecting line starts there) or the button depicted at 143 (if the connecting line starts there) can be connected. If the pointer is not over an object to which a connection can be made, then at step 67 all connecting lines are removed from the screen and the main connection routine ends at step 68.

If at test 66, the pointer is over an object to which a connection can be made, then at step 69 a frame is displayed around the object and the system checks at test 600 to see if the inspector window is visible. If the inspector window is not visible, it is made visible at step 601, and in any event the system checks at test 602 to see if the inspector window is in the connection mode. If the inspector window is not in the connection mode, then it is set to the connection mode at step 603, and in any event the available program outlets are displayed at step 604 in the left-hand column of the inspector window. At test 605, the system tests to see if any of the displayed outlets are already connected. If any of the displayed outlets are connected, then at step 606 an asterisk is displayed next to each one that is connected, and in any event the system checks at test 607 to see if the mouse button has been clicked. If the mouse button has not been clicked, the system continues to test for a click at test 607. If the mouse button has been clicked, then the system checks at test 608 to see if the pointer is within the inspector window. If the pointer is not within the inspector window, then all connecting lines are removed from the screen at step 609 and the main connection routine ends at step 610.

If at test 608 the pointer is within the inspector window, then the system checks at test 611 to see if the pointer is over the name of an action in the right-hand column of the inspector window. If the pointer is over the name of an action in the right-hand column of the inspector window, then at step 612 the action under the pointer is highlighted and any previously highlighted action is unhighlighted, and the system returns to test 607 to check for further clicking of the mouse button.

If at test 611 the pointer is not over the name of an action in the right-hand column of the inspector window, then at test 613 the system checks to see if the pointer is over the name of an outlet in the left-hand column of the inspector window. If the pointer is over the name of an outlet in the left-hand column of the inspector window, then at step 614 the outlet under the pointer is highlighted and any previously highlighted outlet is unhighlighted, and at step 615 the system invokes the outlet selection routine of FIG. 7, below. If at test 613, the pointer is not over the name of an outlet in the left-hand column of the inspector window, then at test 616 the system checks to see if the pointer is over the connect button. If the pointer is not over the connect button, then the system returns to test 607 to check for further clicking of the mouse button. If at test 616 the pointer is over the connect button, then at step 617 the system invokes the connection making routine of FIG. 8, below.

Figure 7:
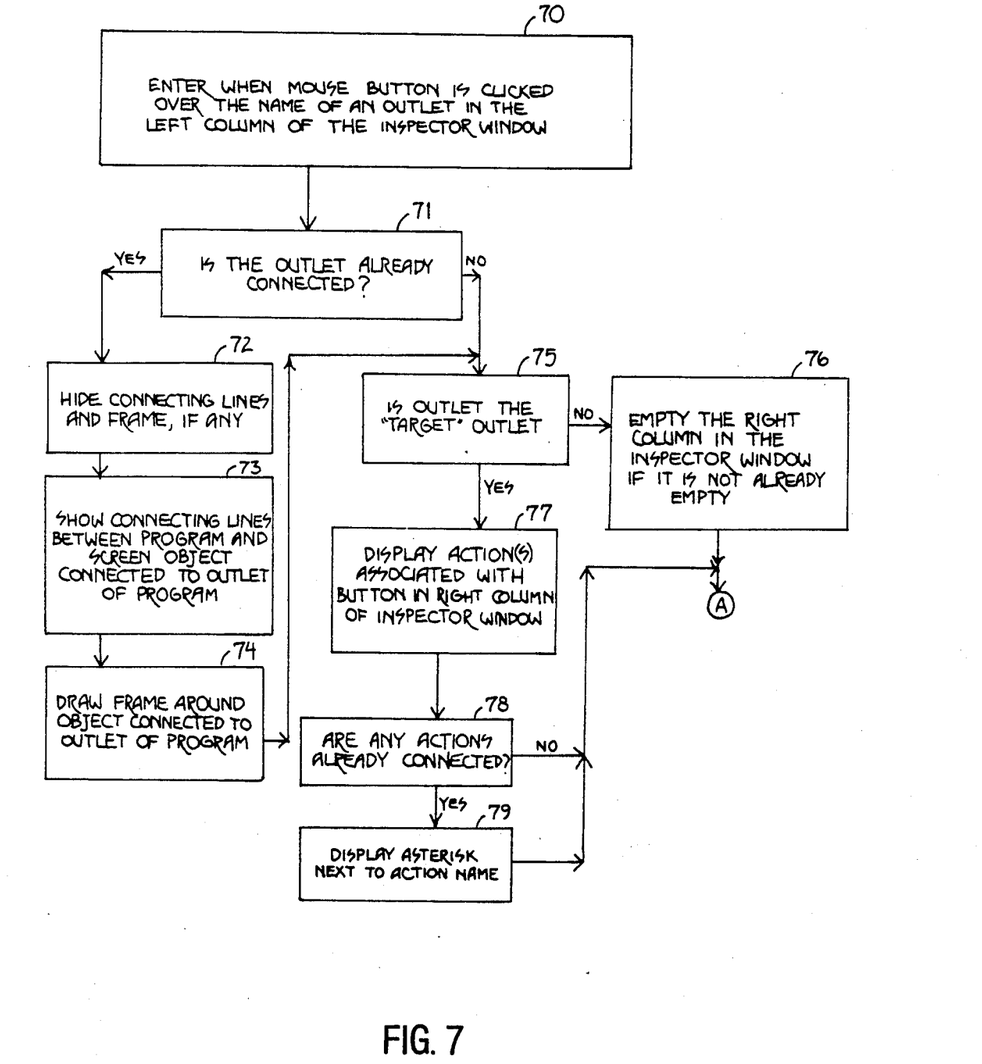
FIG. 7 is a flow diagram of a portion of the process implemented by another portion of the connection process of the system and method of the present invention.

FIG. 7 is a flow diagram of the outlet selection routine referred to above, which is invoked at step 615 in FIG. 6. The routine is entered at step 70 when the mouse button is clicked while the pointer is over the name of an outlet in the left-hand column of the inspector window. The system checks at test 71 to see if the outlet that the pointer is over is already connected to a screen object. If the outlet that the pointer is over is already connected to a screen object, then any connecting lines and frame that may be visible are removed from the screen at step 72, new connecting lines between the program and the screen object connected to the outlet are displayed at step 73, and a frame is drawn around the object connected to the outlet at step 74.

From step 74, or if at test 71 the outlet that the pointer is over is not already connected to a screen object, the system proceeds to test 75 to see if the outlet the pointer is over is the "target" outlet. If the outlet the pointer is over is not the "target" outlet, then no actions should be visible in the right-hand column of the inspector window, and at step 76 any actions that may have been visible in the right-hand column of the inspector window from a previously highlighted "target" outlet are removed from the screen. The system then returns to test 607 of the main connection routine to await further mouse clicks.

If at test 75 the outlet the pointer is over is the "target" outlet, then at step 77 any action or actions associated with the button highlighted on the screen are displayed in the right-hand column of the inspector window. At test 78, the system tests to see if any of the displayed actions are already connected to other program segments. If none of the displayed actions are already connected to other program segments, then the system returns to test 607 of the main connection routine to await further mouse clicks. If any of the displayed actions are already connected to other program segments, then at step 79 an asterisk is displayed next to the name of each action so connected, and then the system returns to test 607 of the main connection routine to await further mouse clicks.

Figure 8:
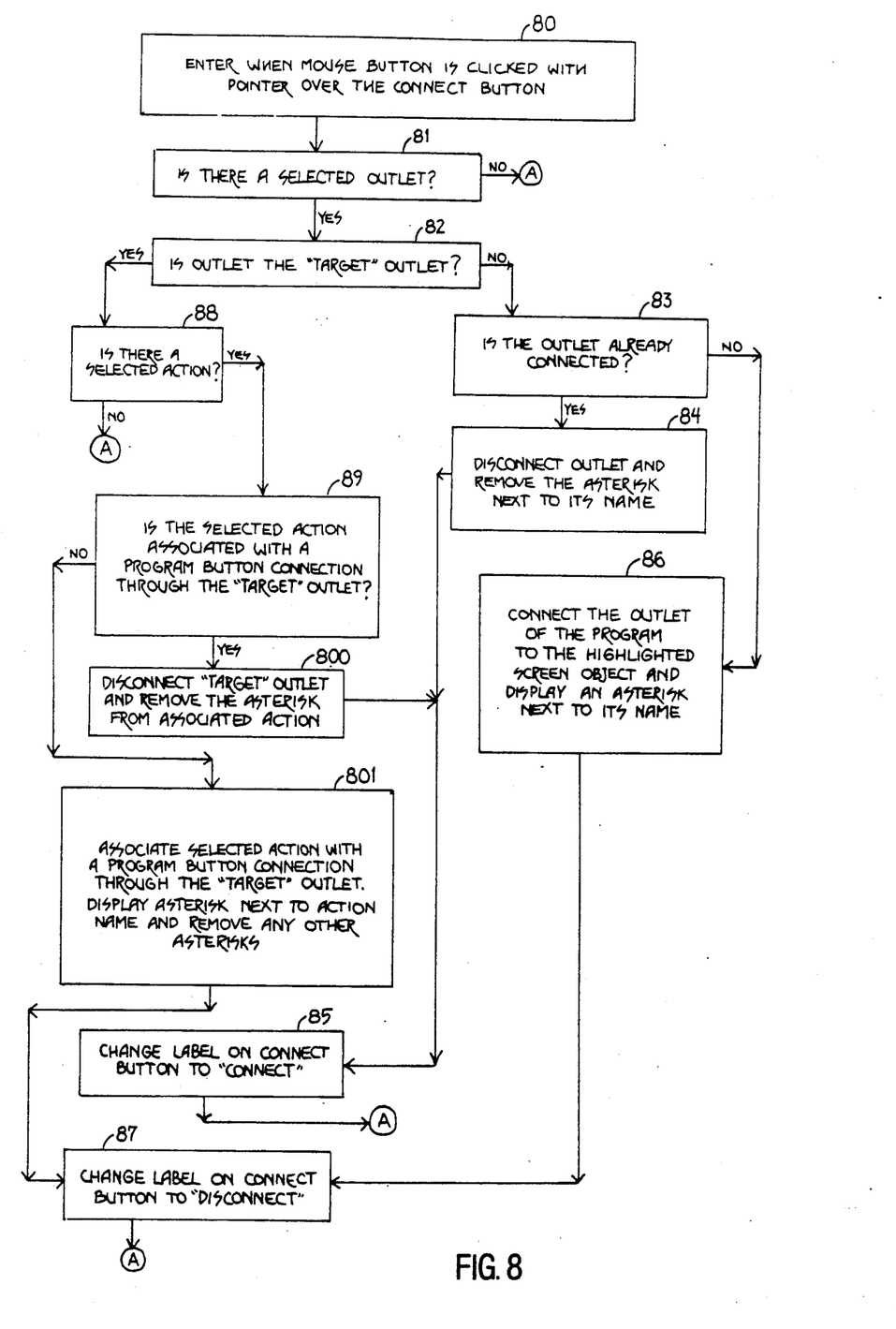
FIG. 8 is a flow diagram of a portion of the process implemented by another portion of the connection process of the system and method of the present invention.

FIG. 8 is a flow diagram of the connection making routine referred to above, which is invoked at step 617 in FIG. 6. The routine is entered at step 80 when the mouse button is clicked while the pointer is over the connect button. At test 81, the system checks to see if there is a selected outlet. If there is no selected outlet, then the system returns to test 607 of the main connection routine to await further mouse clicks. If at test 81 there is a selected outlet, the system checks at test 82 to see if the selected outlet is the "target" outlet. If the selected outlet is not the "target" outlet, then at test 83 the system checks to see if the outlet is already connected. If the outlet is already connected, then at step 84 the outlet is disconnected from the highlighted screen object and the asterisk is removed from next to the name of the outlet in the left-hand column of the inspector window. The label of the connect button is then changed to "Connect" at step 85, and then the system returns to test 607 of the main connection routine to await further mouse clicks. If at test 83 the outlet is not already connected, then at step 86 the outlet is connected to the highlighted screen object and an asterisk is displayed next to the name of the outlet in the left-hand column of the inspector window. The label of the connect button is then changed to "Disconnect" at step 87, and then the system returns to test 607 of the main connection routine to await further mouse clicks.

If at test 82 the outlet is the "target" outlet, then at test 88 the system checks to see if there is a highlighted action in the right-hand column of the inspector window. If there is not a highlighted action in the right-hand column of the inspector window, then the system returns to test 607 of the main connection routine to await further mouse clicks. If there is a highlighted action in the right-hand column of the inspector window, then at test 89 the system checks to see if the highlighted action is associated with a program-button connection through the "target" outlet. If the highlighted action is associated with a program-button connection through the "target" outlet, then at step 800 the "target" outlet is disconnected and the asterisk next to the name of the associated action in the right-hand column of the inspector window is removed from the screen. The label of the connect button is then changed to "Connect" at step 85, and then the system returns to test 607 of the main connection routine to await further mouse clicks. If at test 89 the highlighted action is not associated with a program-button connection through the "target" outlet, then at step 801 a "target" outlet-program connection is made, the highlighted action is associated with that connection, an asterisk is displayed next to the name of the action in the right-hand column of the inspector window, and any other asterisks in the right-hand column of the inspector window are removed from the screen. The label of the connect button is then changed to "Disconnect" at step 87, and then the system returns to test 607 of the main connection routine to await further mouse clicks.

HARDWARE SYSTEM

Figure 9:
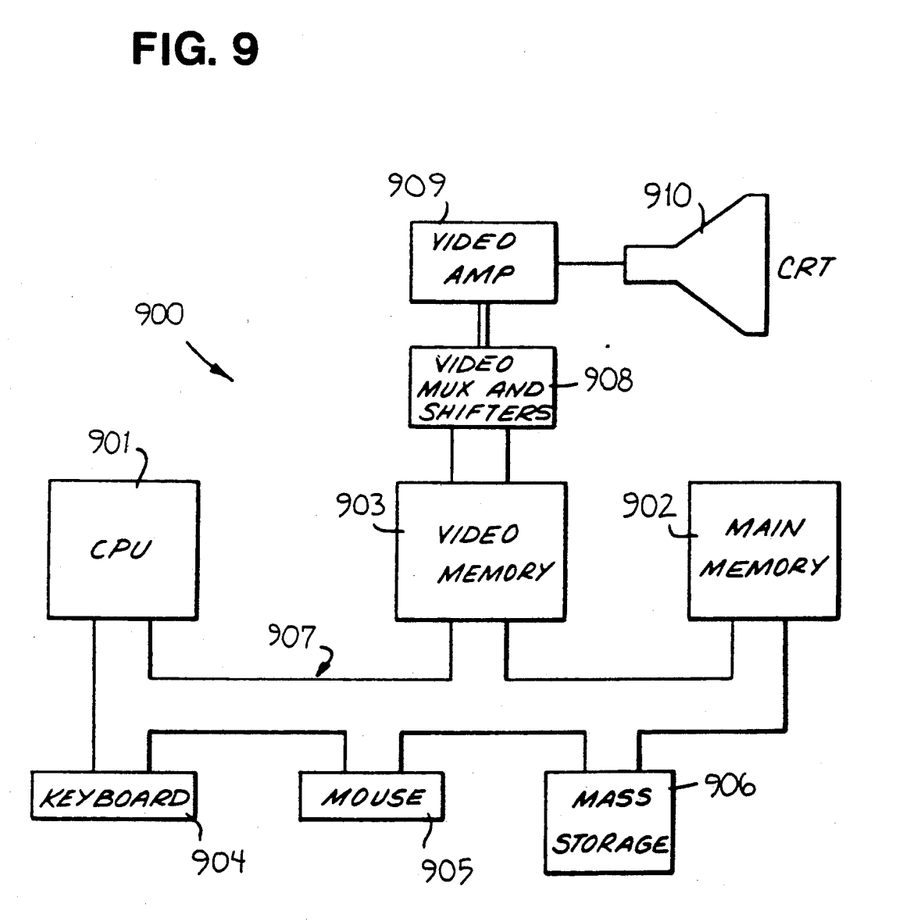
FIG. 9 is a block diagram of an exemplary hardware configuration for a computer on which the system and method of the present invention are implemented.

While the present invention may advantageously be implemented on nearly any conventional computer system, an exemplary computer system 900 on which the present invention is implemented is shown in FIG. 9.

FIG. 9 shows a preferred embodiment of a hardware system 900 implementing the present invention as part of a computer system. In FIG. 9, system 900 includes CPU 901, main memory 902, video memory 903, a keyboard 904 for user input, supplemented by a conventional mouse 905 for manipulating graphic images according to the present invention, and mass storage 906 which may include both fixed and removable media using any one or more of magnetic, optical or magnetooptical, storage technology or any other available mass storage technology. These components are interconnected via conventional bidirectional system bus 907. Bus 907 contains 32 address lines for addressing any portion of memory 902 and 903. System bus 907 also includes a 32 bit data bus for transferring data between and among CPU 901, main memory 902, video memory 903, and mass storage 906. In the preferred embodiment of system 900, CPU 901 is a Motorola 68030 32-bit microprocessor, but any other suitable microprocessor or microcomputer may alternatively be used. Detailed information about the 68030 microprocessor, in particular concerning its instruction set, bus structure, and control lines, is available from MC68030 *User's Manual*, published by Motorola Inc., of Phoenix, Ariz.

Main memory 902 of system 900 comprises eight megabytes of conventional dynamic random access memory, although more or less memory may suitably be used. Video memory 903 comprises 256K bytes of conventional dual-ported video random access memory. Again, depending on the resolution desired, more or less such memory may be used. Connected to a port of video memory 903 is video multiplex and shifter circuitry 908, to which in turn is connected video amplifier 909. Video amplifier 909 drives cathode-ray tube (CRT) raster monitor 910. Video multiplex and shifter circuitry 908 and video amplifier 909, which are conventional, convert pixel data stored in video memory 903 to raster signals suitable for use by monitor 910. Monitor 910 is of a type suitable for displaying graphic images having a resolution of 1120 pixels wide by 832 pixels high.

Thus it is seen that a graphic interface configuration utility is provided that allows graphic elements in the interface to be linked to variables or functions in any one of a number of programming elements. One skilled in the art will appreciate that the present invention can be practiced by other than the described embodiments, which are presented for purposes of illustration and not of limitation, and the present invention is limited only by the claims which follow.

What is claimed is:

1. In a computer system having a visual display on which an application program is represented by a graphic image, said application program having at least one program routine having variables and action portions, said application program being executed through a graphical program interface that provides a program window on said display, said program window containing graphic elements representing user inputs and outputs, said graphic image and graphic elements being capable of being moved on said display by a suer, a graphical program interface configuration system for allowing a programmer to define said graphical program interface, said system comprising:
    programmer-controllable graphical definition means for allowing a programmer to define said program window;
    programmer-controllable graphical placement means for for allowing a programmer to place at least one of said graphic elements in said program window;
    programmer-controllable graphical connection means for allowing a programmer to logically designate any of said at least one graphic element as an input/output element for any one of said at least one program routine.

2. The graphical program interface configuration system of claim 1 wherein said at least one graphic element represents an input field for a variable, and said programmer-controllable graphical connection means is for logically designating said graphic element as an input/output element for a variable in said program routine.

3. The graphical program interface configuration system of claim 1 wherein said at least one graphic element represents an action for selection by a user, and said programmer-controllable graphic connection means is for logically designating said graphic element as an input element for an action portion in said program routine.

4. The graphical program interface configuration system of claim 1 wherein said programmer-controllable graphical connection means comprises means for graphically displaying a logical designation established between said graphic element and said program routine.

5. The graphical program interface configuration system of claim 4, wherein said programmer-controllable graphical connection means further comprises means for graphically highlighting said graphic element and said program routine while said logical designation is displayed.

6. The graphical program interface configuration system of claim 4, wherein said graphical connection means further comprises means for graphically displaying said variables and said action portions for which said graphical element can be designated as an input-/output element.

7. The graphical program interface configuration system of claim 6, wherein said graphical variable and action portion display means comprises means for indicting if any one of said variables and action portions has a graphic element logically designated as an input-/output element therefor.

8. The graphical program interface configuration system of claim 6 wherein said graphical variable and action portion display means comprises means for selecting one of said displayed variables and action portions.

9. The graphical program interface configuration system of claim 8 wherein said graphical variable and action portion display means comprises actuation means for (a) if a selected one of said displayed variables and action portions does not have a graphic element logically designated as an input/output element therefor, logically designating said graphic element as an input-/output element for said selected one of said displayed variables and action portions, and (b) if a selected one of said displayed variables and action portions has a graphic element logically designated as an input/output element therefor, cancelling logical designation of said graphic element as an input/output element for said selected one of said displayed variables and action portions.

10. The graphical program interface configuration system of claim 9 wherein said programmer-invocable actuation means changes its appearance according to whether or not said selected one of said displayed variables and action portions has a graphic element logically designated as an input/output element therefor.

11. The graphical program interface configuration system of claim 8 wherein said programmer-controllable graphical connection means comprises means for, if a selected one of said displayed variables and action portions is subject to a pre-existing logical designation of a second graphic element in said program window as an input/output element therefor, terminating the graphical display of an attempted logical designation established between said graphic element and said one of said variables and action portions and graphically displaying said pre-existing logical designation between said second graphic element and said one of said variables and action portions.

12. For use in a computer system having a visual display on which an application program is represented by a graphic image, said application program having at least one program routine having variables and action portions, said application program being executed through a graphical program interface that provides a program window on said display, said program window containing graphic elements representing user inputs and outputs, said graphic image and graphic elements being capable of being moved on said display by a user, a graphical program interface configuration method for allowing a programmer to define said graphical program interface, said method comprising the steps of:
  allowing a programmer to graphically define said window;
  allowing a programmer to graphically place at least one of said graphic elements in said window;
  allowing a programmer to graphically logically designate any of said at least one graphic element as an input/output element for any one of said at least one program routine.

13. The graphical program interface configuration method of claim 12 wherein said at least one graphic element represents an input field for a variable, and said graphical logical designation step is for logically designating said graphic element as an input/output element for a variable in said program routine.

14. The graphical program interface configuration method of claim 12 wherein said at least one graphic element represents an action for selection by a user, and said graphical logical designation step is for logically designating said graphic element as an input element for an action portion in said program routine.

15. The graphical program interface configuration method of claim 12 wherein said graphical designation step comprises graphically displaying a logical designation established between said graphic element and said program routine.

16. The graphical program interface configuration method of claim 15, wherein said graphical designation step further comprises graphically highlighting said graphic element and said program routine while said logical designation is displayed.

17. The graphical program interface configuration method of claim 15, wherein said graphical designation step further comprises graphically displaying said variables and said action portions for which said graphical element could be designated as an input/output element.

18. The graphical program interface configuration method of claim 17, wherein said graphical variable and action portion displaying step comprises indicating if any one of said variables and action portions has a graphic element logically designated as an input/output element therefor.

19. The graphical program interface configuration method of claim 17 wherein said graphical variable and action portion displaying step comprises selecting one of said displayed variables and action portions.

20. The graphical program interface configuration method of claim 19 wherein said graphical variable and action portion displaying step comprises an actuation step of (a) if a selected one of said displayed variables and action portions does not have a graphic element logically designated as an input/output element therefor, logically designating said graphic element as an input/output element for said selected one of said displayed variables and action portions, and (b) if a selected one of said displayed variables and action portions has a graphic element logically designated as an input/output element therefor, cancelling logical designation of said graphic element as an input/output element for said selected one of said displayed variables and action portions.

21. The graphical program interface configuration method of claim 19 wherein said graphical designation step comprises, if a selected one of said displayed variables and action portions is subject to a pre-existing logical designation of a second graphic element in said program window as an input/output element therefor, terminating the graphical display of an attempted logical designation established between said graphic element and said one of said variables and action portions and graphically displaying said pre-existing logical designation between said second graphic element and said one of said variables and action portions.

* * * * *

UNITED STATES PATENT AND TRADEMARK OFFICE
CERTIFICATE OF CORRECTION

PATENT NO. : 5,163,130
DATED : Nov. 10, 1992
INVENTOR(S) : Jean-Marie Hullot

It is certified that error appears in the above-indentified patent and that said Letters Patent is hereby corrected as shown below:

Item [57] Abstract, line 1, "is" should be deleted.

Column 1, line 6, "abandoned" should be -- now abandoned, --.

Column 3, line 7, "graphic," should be -- graphic --.

Claim 1, column 10, line 35, "suer." should be -- user, --;

column 10, line 43, "for" (second occurrence) should be deleted.

Claim 3, column 10, line 60, "graphic" should be
-- graphical --.

Signed and Sealed this

Twelfth Day of April, 1994

BRUCE LEHMAN

*Attest:*

*Attesting Officer*

*Commissioner of Patents and Trademarks*